United States Patent
Onodera et al.

(10) Patent No.: US 10,889,242 B2
(45) Date of Patent: Jan. 12, 2021

(54) NOTIFICATION APPARATUS FOR NOTIFYING OF IN-VEHICLE PRESENCE

(71) Applicant: SUBARU CORPORATION, Tokyo (JP)

(72) Inventors: Akihiro Onodera, Tokyo (JP); Masashi Sasaki, Tokyo (JP); Ryo Saijo, Tokyo (JP); Yusuke Yadomaru, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/239,291

(22) Filed: Jan. 3, 2019

(65) Prior Publication Data

US 2019/0263320 A1 Aug. 29, 2019

(30) Foreign Application Priority Data

Feb. 27, 2018 (JP) ................. 2018-032889

(51) Int. Cl.
*B60Q 9/00* (2006.01)
*B60N 2/00* (2006.01)
*G08B 21/24* (2006.01)

(52) U.S. Cl.
CPC ............ *B60Q 9/00* (2013.01); *B60N 2/002* (2013.01); *G08B 21/24* (2013.01)

(58) Field of Classification Search
CPC .......... B60Q 9/00; B60N 2/002; G08B 21/24
See application file for complete search history.

(56) References Cited

U.S. PATENT DOCUMENTS

| 2015/0165932 A1* | 6/2015 | Maley ............... B60N 2/002 340/457 |
| 2018/0111597 A1* | 4/2018 | May ................... B60K 28/12 |
| 2018/0253959 A1* | 9/2018 | Andrade ............. B60N 2/002 |

FOREIGN PATENT DOCUMENTS

JP 2013-129231 A 7/2013

* cited by examiner

*Primary Examiner* — Brian A Zimmerman
*Assistant Examiner* — Kevin Lau
(74) *Attorney, Agent, or Firm* — McDermott Will & Emery LLP

(57) ABSTRACT

A vehicle notification apparatus includes an output unit, a riding detector, a driver detector, and a controller. The output unit is configured to output a leaving notification that provides notification of leaving behind of a passenger, etc. The riding detector is configured to detect passenger vehicle entering, passenger vehicle exiting, etc. The driver detector is configured to detect vehicle traveling stop operation, vehicle traveling start operation, driver vehicle entering operation, and driver vehicle exiting operation. The controller is configured to cause output of the leaving notification on a condition that the passenger vehicle entering, etc. has been detected when the vehicle traveling stop operation, the driver vehicle exiting operation, or both are detected, and also to cause the output of the leaving notification each time the vehicle traveling stop operation, the driver vehicle exiting operation, or both are detected, until the passenger vehicle exiting, etc. is detected.

17 Claims, 3 Drawing Sheets

NOTIFICATION APPARATUS FOR NOTIFYING OF IN-VEHICLE PRESENCE

CROSS-REFERENCE TO RELATED APPLICATIONS

The present application claims priority from Japanese Patent Application No. 2018-032889 filed on Feb. 27, 2018, the entire contents of which are hereby incorporated by reference.

BACKGROUND

The technology relates to a notification apparatus that suppresses leaving behind of a passenger, baggage, or both in a vehicle.

Japanese Unexamined Patent Application Publication (JP-A) No. 2013-129231 discloses a vehicle warning apparatus that outputs a warning in a case where there is a difference between an open-close pattern of a door at the time of entering with respect to a vehicle and an open-close pattern of the door at the time of exiting with respect to the vehicle.

For example, in a case where a driver has opened a rear door and let a passenger, baggage, or both get on a rear seat, this apparatus is able to output the warning for the driver when the driver opens a front door to exit the vehicle.

The warning makes the driver notice that the passenger, the baggage, or both are still in the vehicle. Therefore, the driver can open the rear door and let the passenger, the baggage, or both get off of the rear seat.

SUMMARY

An aspect of the technology provides a vehicle notification apparatus that includes an output unit, a riding detector, a driver detector, and a controller. The output unit is configured to output a leaving notification that provides a warning of leaving a passenger, baggage, or both behind in a vehicle. The riding detector is configured to detect any of passenger vehicle entering, passenger vehicle exiting, baggage vehicle entering, and baggage vehicle exiting. The passenger vehicle entering is entering of the passenger with respect to the vehicle. The passenger vehicle exiting is exiting of the passenger with respect to the vehicle. The baggage vehicle entering is entering of the baggage with respect to the vehicle. The baggage vehicle exiting is exiting of the baggage with respect to the vehicle. The driver detector is configured to detect any of vehicle traveling stop operation, vehicle traveling start operation, driver vehicle entering operation, and driver vehicle exiting operation. The vehicle traveling stop operation is operation, performed by a driver of the vehicle, directed to stopping of traveling of the vehicle. The vehicle traveling start operation is operation, performed by the driver, directed to starting of the traveling of the vehicle. The driver vehicle entering operation is operation, performed by the driver, directed to entering of the driver with respect to the vehicle. The driver vehicle exiting operation is operation, performed by the driver, directed to exiting of the driver with respect to the vehicle. The controller is configured to cause the output unit to output the leaving notification on a condition that the riding detector has already detected the passenger vehicle entering, the baggage vehicle entering, or both when the driver detector detects the vehicle traveling stop operation, the driver vehicle exiting operation, or both. The controller is also configured to cause the output unit to output the leaving notification each time the driver detector detects the vehicle traveling stop operation, the driver vehicle exiting operation, or both, until the riding detector detects the passenger vehicle exiting, the baggage vehicle exiting, or both.

An aspect of the technology provides a vehicle notification apparatus that includes an output unit, a riding detector, a driver detector, and circuitry. The output unit is configured to output a leaving notification that provides a warning of leaving a passenger, baggage, or both behind in a vehicle. The riding detector is configured to detect any of passenger vehicle entering, passenger vehicle exiting, baggage vehicle entering, and baggage vehicle exiting. The passenger vehicle entering is entering of the passenger with respect to the vehicle. The passenger vehicle exiting is exiting of the passenger with respect to the vehicle. The baggage vehicle entering is entering of the baggage with respect to the vehicle. The baggage vehicle exiting is exiting of the baggage with respect to the vehicle. The driver detector is configured to detect any of vehicle traveling stop operation, vehicle traveling start operation, driver vehicle entering operation, and driver vehicle exiting operation. The vehicle traveling stop operation is operation, performed by a driver of the vehicle, directed to stopping of traveling of the vehicle. The vehicle traveling start operation is operation, performed by the driver, directed to starting of the traveling of the vehicle. The driver vehicle entering operation is operation, performed by the driver, directed to entering of the driver with respect to the vehicle. The driver vehicle exiting operation is operation, performed by the driver, directed to exiting of the driver with respect to the vehicle. The circuitry is configured to cause the output unit to output the leaving notification on a condition that the riding detector has already detected the passenger vehicle entering, the baggage vehicle entering, or both when the driver detector detects the vehicle traveling stop operation, the driver vehicle exiting operation, or both. The circuitry is configured to cause the output unit to output the leaving notification each time the driver detector detects the vehicle traveling stop operation, the driver vehicle exiting operation, or both, until the riding detector detects the passenger vehicle exiting, the baggage vehicle exiting, or both.

DETAILED DESCRIPTION

In the following, a description is given of an implementation of the technology with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology.

Further, elements in the following example implementations which are not recited in a most-generic independent claim of the disclosure are optional and may be provided on an as-needed basis. The drawings are schematic and are not intended to be drawn to scale.

A warning apparatus according to JP-A No. 2013-129231 outputs a notification on the basis of an open-close pattern of a door; however, the warning is not output, for example, in the following case.

For example, after a driver temporarily exits a vehicle on the way of driving to a destination and enters the vehicle again, a vehicle may arrive at the destination where a passenger, baggage, or both are to be caused to exit the vehicle. In this case, the recent open-close pattern of the door directed to entering and exiting with respect to the vehicle includes only opening and closing of a front door which allows for entering and exiting of the driver with respect to the vehicle. In this case, although the passenger, the baggage, or both that have entered the vehicle upon the previous entering with respect to the vehicle still remain in the rear seat, the warning is not output.

In view of this, an improvement for a vehicle is desired that allows for more appropriate output of a warning directed to suppression of leaving-behind of a passenger or baggage.

Figure 1:
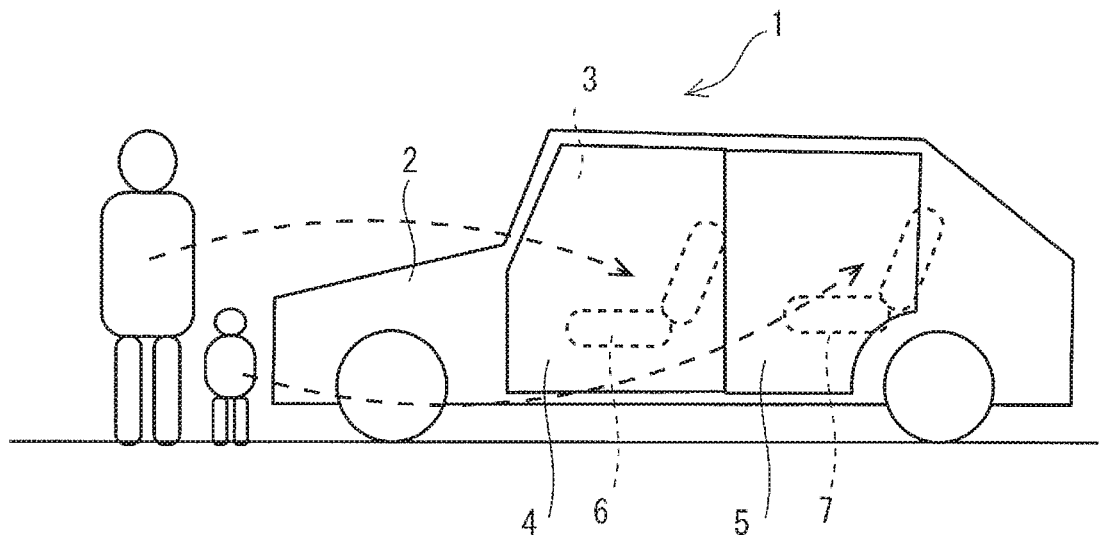
FIG. 1 is an explanatory diagram illustrating an example of an automobile according to one implementation of the technology.

FIG. 1 is an explanatory diagram illustrating an automobile 1 according to an example implementation of the technology.

In one implementation, the automobile 1 may serve as a "vehicle". The automobile 1 may travel by utilizing power of an internal combustion engine, stored electric power of a battery, or both.

The automobile 1 illustrated in FIG. 1 may include a body 2. The body 2 may include a vehicle compartment 3 that is provided at a middle part of the body 2. The vehicle compartment 3 may be a compartment which an occupant such as a driver or a passenger enters. The body 2 may include a front door 4 and a rear door 5 that are provided at a side part of the body 2. In one example, the rear door 5 may be provided at a back surface part of the body 2. The driver may open and close the front door 4 to enter the vehicle compartment 3 and sit on a front seat 6. The driver may also open and close the rear door 5 to cause the passenger to get on a rear seat 7, for example. It is to be noted that baggage may also be put on the rear seat 7 or any other seat. The driver may operate operation members such as a steering wheel, a brake pedal, or an accelerator pedal, which is not illustrated in the drawing. Thus, the automobile 1 may travel, stop, turn right, and turn left in accordance with the operation of the driver.

Figure 2:
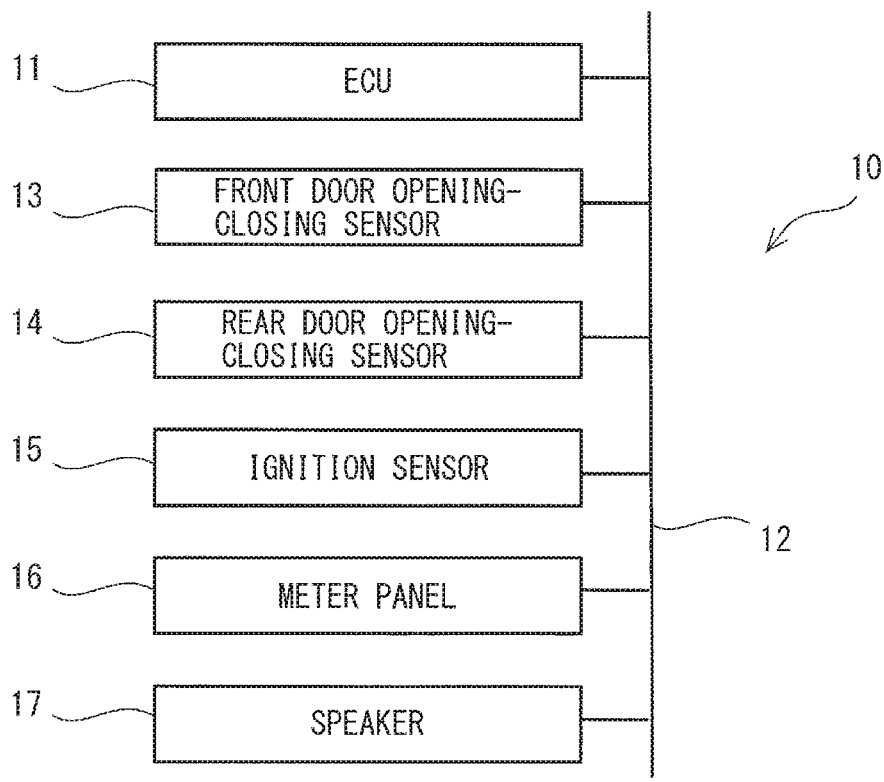
FIG. 2 is an explanatory diagram illustrating an example of a control apparatus that serves as a notification apparatus for the automobile illustrated in FIG. 1.

FIG. 2 is an explanatory diagram illustrating a control apparatus 10 of the automobile 1 illustrated in FIG. 1. In one implementation, the control apparatus 10 may serve as a "notification apparatus".

The control apparatus 10 of the automobile 1 illustrated in FIG. 2 may include an electrical control unit (ECU) 11, multiple sensors, and multiple vehicle-mounted units. In one implementation, the ECU 11 may serve as a "controller". The ECU 11, the multiple sensors, and the multiple vehicle-mounted units may be coupled to each other via a network 12.

For example, the network 12 may be a wired communication network conforming to a controller area network (CAN) or a local interconnect network (LIN). In one example, part of the network 12 may be a wireless communication network. The ECU 11, the sensors, and the vehicle-mounted units may perform transmission and reception of data via the network 12 with each other.

For example, FIG. 2 illustrates a front door opening-closing sensor 13, a rear door opening-closing sensor 14, and an ignition sensor 15 as examples of the multiple sensors.

FIG. 2 also illustrates a meter panel 16 and a speaker 17 as examples of the multiple vehicle-mounted units.

The front door opening-closing sensor 13 may detect opening and closing of the front door 4 that is to be opened and closed at the time when the occupant such as the driver enters or exits the automobile 1.

The rear door opening-closing sensor 14 may detect opening and closing of the rear door 5 that is to be opened and closed at the time when the passenger, the baggage, or both enter the automobile 1.

The ignition sensor 15 may detect ON-OFF operation of an unillustrated ignition switch. The ignition switch may be operated to cause the automobile 1 to be in a travelable state.

On the basis of the ON operation performed on the ignition switch, the ECU 11 may start a power source such as an engine and also may allow the power source to be in a startable state.

On the basis of the OFF operation performed on the ignition switch, the ECU 11 may cause the power source such as an engine to be in a non-startable state.

The meter panel 16 may be provided at a dashboard that is positioned on front side of the front seat 6 in the vehicle compartment 3. The meter panel 16 may include a message displaying device that displays a traveling state of the vehicle. Non-limiting examples of the message displaying device may include a liquid crystal device.

The speaker 17 may be provided to the front door 4, the rear door 5, or both, toward the vehicle compartment 3. The speaker 17 may output, for example, a predetermined notification sound and a predetermined notification message.

In one example, the ECU 11 may be implemented by a computer device including a central processing unit (CPU), a random-access memory (RAM), storage, a network interface, and any other components. The CPU may read and execute a program from the storage. This may cause the ECU 11 to serve as a controller of the automobile 1.

The ECU 11 may control traveling of the automobile 1 by controlling an internal combustion engine, a brake device, and a steering device, in accordance with operation performed by the driver on the operation member or a route guided by a route guiding device. The internal combustion engine, the brake device, and the steering device are not illustrated in the drawing.

Moreover, the ECU 11 may execute other control related to the automobile 1 by using the network interface to communicate with the sensors and the vehicle-mounted devices, which are coupled to the network 12.

For example, in a case where the driver is present on the front seat 6 while the baggage, the passenger, or both are present on the rear seat 7 as illustrated in FIG. 1, the ECU 11 may output, from the message displaying device of the meter panel 16 or the speaker 17, a leaving notification that warns the driver of leaving a passenger or baggage behind in the automobile 1 at the time when the driver exits the automobile 1. Alternatively or additionally, for example, the ECU 11 may turn on an unillustrated notification lamp or may cause the steering wheel to vibrate. Thus, the control apparatus 10 illustrated in FIG. 2 may serve as a notification apparatus of the automobile 1.

In a case of outputting a notification directed to suppression of leaving-behind of a passenger or baggage in the automobile 1, the notification may be preferably output only when it is necessary, rather than being output whenever the driver exits the automobile 1.

This is because, if the notification directed to suppression of the leaving-behind is output whenever the driver exits the vehicle, the driver may become used to receive the notification and may not pay attention to the notification.

Meanwhile, the notification directed to suppression of the leaving-behind may be also desirably output in a situation other than a situation in which the driver causes the baggage, the passenger, or both to get on the rear seat 7 at the time the driver enters the automobile 1.

For example, after the driver temporarily exits the automobile 1 on the way of driving to a destination, the driver may re-enter the automobile 1 and the automobile 1 may arrive at the destination where the passenger, the baggage, or both are to be caused to exit the automobile 1. Also in this case, the notification directed to suppression of the leaving-behind may be desirably output.

In this case, probability that the driver who has entered and exited the automobile 1 a few times forgets to cause the passenger, the baggage, or both to exit the automobile 1 at the destination.

In view of these circumstances, there is a need to improve the notification directed to suppression of the leaving-behind and thereby achieve more appropriate output of the notification in the automobile 1.

Figure 3:
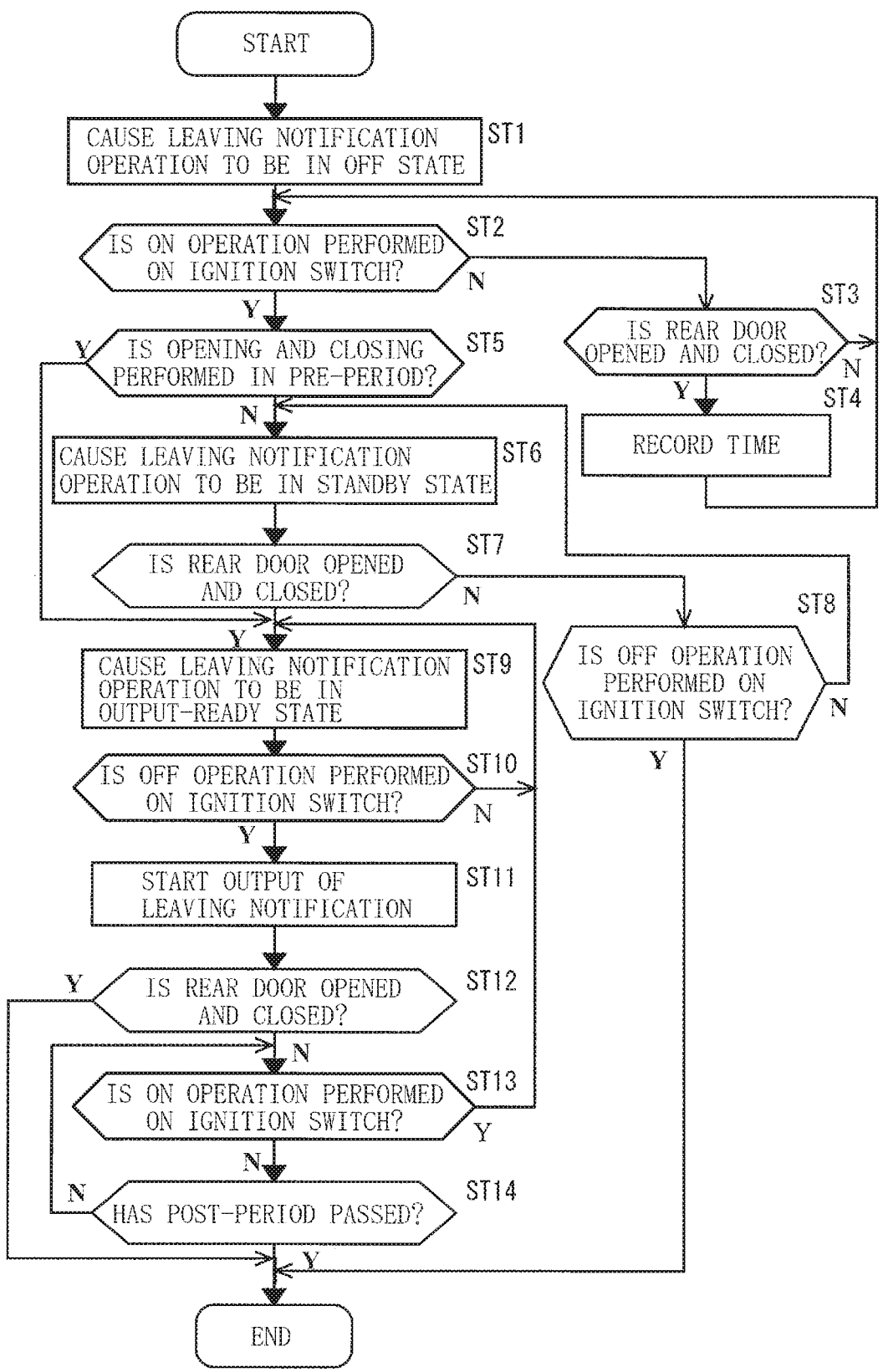
FIG. 3 is a flowchart illustrating an example of a notification process to be performed by an electric control unit (ECU) illustrated in FIG. 2.

FIG. 3 is a flowchart of a notification process to be performed by the ECU 11 serving as a controller illustrated in FIG. 2.

The process illustrated in FIG. 3 may cause a leaving notification to be output each time the driver performs the OFF operation on the ignition switch to allow the driver himself to exit the vehicle, basically until exiting of the passenger, the baggage, or both with respect to the automobile 1 is detected.

The ECU 11 may execute the process illustrated in FIG. 3, basically each time the driver enters the automobile 1.

With reference to FIG. 3, the ECU 11 may first cause a leaving notification operation to be in an OFF state as initial setting, in step ST1.

Causing the leaving notification operation in the OFF state refers to causing the leaving notification operation itself to be in the OFF state.

While the leaving notification operation is in the OFF state, it may not be possible to output the leaving notification.

After the leaving notification operation is caused to be in the OFF state, the ECU 11 may determine, in step ST2, whether the ON operation is performed on the ignition switch that has been in the OFF state, on the basis of detection performed by the ignition sensor 15. The driver may first perform operation to cause the ignition switch to be in an ON state in a case where the driver is to start traveling of the automobile 1.

When the ON operation is not performed on the ignition switch, the ECU 11 may determine, in step ST3, whether a person such as the driver opens and closes the rear door 5 to cause the passenger, the baggage, or both to enter the automobile 1, on the basis of detection performed by the rear door opening-closing sensor 14.

When the rear door 5 is not opened and closed, the ECU 11 may return the process to step ST2. The ECU 11 may repeat the process in step ST2 and step ST3.

When the rear door 5 is opened and closed, the ECU 11 may record, in step ST4, time when the rear door 5 is opened and closed. The time when the rear door 5 is opened and closed may be, for example, based on time of a timer built in the ECU 11. The ECU 11 may, for example, record the time when the rear door 5 is opened and closed, in the storage.

Thereafter, the ECU 11 may return the process to step ST2 and may thereby repeat the process in step ST2 and step ST3.

In response to the ON operation performed on the ignition switch, the ECU 11 may determine, in step ST5, whether the time when the rear door 5 is opened and closed is in a range of a predetermined pre-period before current timing at which the ON operation is performed on the ignition switch. The foregoing pre-period may be, for example, approximately 30 minutes.

Thus, even when the driver performs a light work after causing the passenger, the baggage, or both to enter the automobile 1 and be present on the rear seat 7, the ECU 11 is able to detect that the passenger, the baggage, or both have entered the automobile 1 before the light work is performed.

When the time when the rear door 5 is opened and closed falls within the range of the predetermined pre-period, the ECU 11 may advance the process to step ST9, which will be described later.

When the time when the rear door 5 is opened and closed does not fall within the range of the predetermined pre-period, that is, when the predetermined pre-period has passed from the time when the rear door 5 is opened and closed at latest timing, the ECU 11 may cause, in step ST6, the leaving notification operation to be in a standby state.

The standby state of the leaving notification operation may be one state in a case where the leaving notification operation is in the ON state. During the standby state, the leaving notification operation is unable to output a notification. The standby state may be a preparatory step immediately before an output-ready state.

Thereafter, in step ST7, the ECU 11 may determine whether a person such as the driver opens and closes the rear door 5 to cause the passenger, the baggage, or both to enter the automobile 1 after the ON operation is performed on the ignition switch. The ECU 11 may perform the determination described above in step ST7 on the basis of detection performed by the rear door opening-closing sensor 14.

When the rear door 5 is not opened and closed, the ECU 11 may determine, in step ST8, whether the OFF operation is performed on the ignition switch that has been in the ON state. The ECU 11 may perform the determination described above in step ST8 on the basis of detection performed by the ignition sensor 15.

When the OFF operation is performed on the ignition switch, the ECU 11 may bring the process illustrated in FIG. 3 to an end.

When the OFF operation is not performed on the ignition switch yet, the ECU 11 may return the process to step ST6. The ECU 11 may repeat the process from step ST6 to step ST8 directed to the standby state.

When the rear door 5 is opened and closed before the ON operation is performed on the ignition switch, or when the rear door 5 is opened and closed after the ON operation is performed on the ignition switch, the ECU 11 may cause the leaving notification operation to be in the output-ready state in step ST9.

The output-ready state of the leaving notification operation may be one state in a case where the leaving notification operation is in the ON state. The output-ready state may be a state in which the leaving notification operation is able to output the notification. The output-ready state may be a state in which the ECU 11 is able to output the notification at the time when the driver exits the automobile 1.

Thereafter, in step ST10, the ECU 11 may determine whether the OFF operation is performed on the ignition switch that has been in the ON state.

When the OFF operation is not performed on the ignition switch yet, the ECU 11 may return the process to step ST9 to maintain the output-ready state.

The ECU 11 may repeat the process in steps ST9 and ST10 until the OFF operation is performed on the ignition switch.

When the OFF operation is performed on the ignition switch, the ECU 11 may start outputting the leaving notification in step ST11. The ECU 11 may, for example, output an electronic sound from the speaker 17 to draw attention. In another example, the ECU 11 may display a message on the message displaying device of the meter panel 16 to notify a person of the possibility of the leaving-behind. For example, the ECU 11 may continue outputting the notification for a certain period.

After starting output of the notification, the ECU 11 may determine, in step ST12, whether a person such as the driver opens and closes the rear door 5 to cause the passenger, the baggage, or both to exit the automobile 1.

When the rear door 5 is opened and closed to cause the passenger, the baggage, or both to exit the automobile 1, the ECU 11 may bring the process illustrated in FIG. 3 to the end.

When the rear door 5 is not opened and closed to cause the passenger, the baggage, or both to exit the automobile 1, the ECU 11 may determine, in step ST13, whether the ON operation is performed again on the ignition switch on which the OFF operation has been once performed. Re-performing of the ON operation on the ignition switch while opening and closing of the rear door 5 are still not detected after the leaving notification is output may allow the ECU 11 to detect that the current stopping of the automobile 1 is not directed to exiting of the passenger, the baggage, or both with respect to the automobile 1.

When the ON operation is performed again on the ignition switch, the ECU 11 may return the process to step ST9 to cause the leaving notification operation to be in the output-ready state.

The ECU 11 may repeat the process from step ST9 to step ST13 until the rear door 5 is opened and closed to cause the passenger, the baggage, or both to exit the automobile 1.

When the OFF operation is performed again on the ignition switch while the process from step ST9 to step ST13 is repeated, the ECU 11 may output the leaving notification again.

When the ON operation is not performed again on the ignition switch, the ECU 11 may determine, in step ST14, whether a predetermined post-period has passed after the notification is output. The post-period may be, for example, approximately 30 minutes.

When the predetermined post-period has not passed, the ECU 11 may return the process to step ST13.

The ECU 11 may repeat the process in steps ST13 and ST14 until the predetermined post-period passes.

When the predetermined post-period has passed while the ON operation is still not performed on the ignition switch again, the ECU 11 may determine, in step ST14, that the predetermined post-period has passed. The ECU 11 may thereby bring the process illustrated in FIG. 3 to the end.

As described above, in the example implementation of the technology, the ECU 11 may output the leaving notification each time the ignition sensor 15 detects the OFF operation, performed by the driver, directed to stopping of the traveling of the automobile 1, until the rear door opening-closing sensor 14 detects exiting of the passenger, the baggage, or both with respect to the automobile 1.

Thus, for example, in a case where, after the driver temporarily enters and exits the automobile 1 on the way of driving to a destination, the automobile 1 arrives at the destination where the passenger, the baggage, or both are to be caused to exit the automobile 1, the notification directed to suppression of the leaving-behind is allowed to be output at the destination.

The output of the notification directed to suppression of the leaving-behind at the destination where the passenger, the baggage, or both are to be caused to exit the automobile 1 makes it more difficult for the driver the driver to forget to cause the passenger, the baggage, or both to exit the automobile 1.

In the example implementation of the technology, in a case where the rear door opening-closing sensor 14 detects opening and closing of the rear door 5 after the ignition sensor 15 detects the ON operation that is performed by the driver to start the traveling of the automobile 1, the ECU 11 may determine that entering of the passenger, the baggage, or both with respect to the automobile 1 is detected, on the basis of the result of the detection performed by the rear door opening-closing sensor 14.

Thus, in a case where the driver causes the passenger, the baggage, or both to enter the automobile 1 after the driver opens and closes the front door 4 to start entering or to start preparing for the entering with respect to the automobile 1, it is allowed to detect causing the passenger, the baggage, or both to enter the automobile 1 to be present on the rear seat 7.

Moreover, in the example implementation, the ECU 11 may determine that the entering of the passenger, the baggage, or both with respect to the automobile 1 is detected also in a case where the rear door opening-closing sensor 14 detects opening and closing of the rear door 5 in the predetermined pre-period before the timing when the ignition sensor 15 detects the ON operation that is performed by the driver to start the traveling of the automobile 1.

Thus, also in a case where the driver enters the automobile 1 after causing the passenger, the baggage, or both to enter the automobile 1 and be present on the rear seat 7, the ECU 11 is able to detect the entering of the passenger, the baggage, or both with respect to the automobile 1.

As described above, the example implementation enables appropriate detection of a state of the entering and exiting of the passenger, the baggage, and the driver based on simple detection regardless of the time relationship between the entering of the passenger, the baggage, or both with respect to the automobile 1 and the entering of the driver with respect to the automobile 1. The simple detection may include detection of opening and closing of the rear door 5, which is performed by the rear door opening-closing sensor 14, and detection of the ON operation and the OFF operation performed on the ignition switch, which is performed by the ignition sensor 15.

In the example implementation, in a case where the ignition sensor 15 detects the ON operation that is performed by the driver to start the traveling of the automobile 1 while the rear door opening-closing sensor 14 still does not detect opening and closing of the rear door 5 after the leaving notification is output, the ECU 11 may determine that exiting of the passenger, the baggage, or both with respect to the automobile 1 is not detected.

Thus, when the ignition sensor 15 detects the OFF operation that is performed by the driver to stop the traveling of the automobile 1 after the above-described determination, by the ECU 11, that the exiting of the passenger, the baggage, or both with respect to the automobile 1 is not detected, the notification directed to suppression of the leaving-behind is allowed to be output again.

The notification may be output each time the driver exits the automobile 1, until the driver opens and closes the rear door 5 to cause the passenger, the baggage, or both to exit the automobile 1. This allows for continuous attention drawing directed to suppression of the leaving-behind.

Although some example implementations of the technology have been described in the foregoing by way of example, the technology is by no means limited to the example implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

According to one example implementation of the technology, a controller may output a leaving notification each time a driver detector detects vehicle traveling stop operation, driver vehicle exiting operation, or both, until a riding detector detects passenger vehicle exiting, baggage vehicle exiting, or both.

Thus, according to one example implementation of the technology, for example, in a case where, after the driver temporarily enters and exits a vehicle on the way of driving to a destination, the vehicle arrives at the destination where the passenger, the baggage, or both are to be caused to exit the vehicle, the leaving notification is allowed to be output at the destination.

Figure 4:
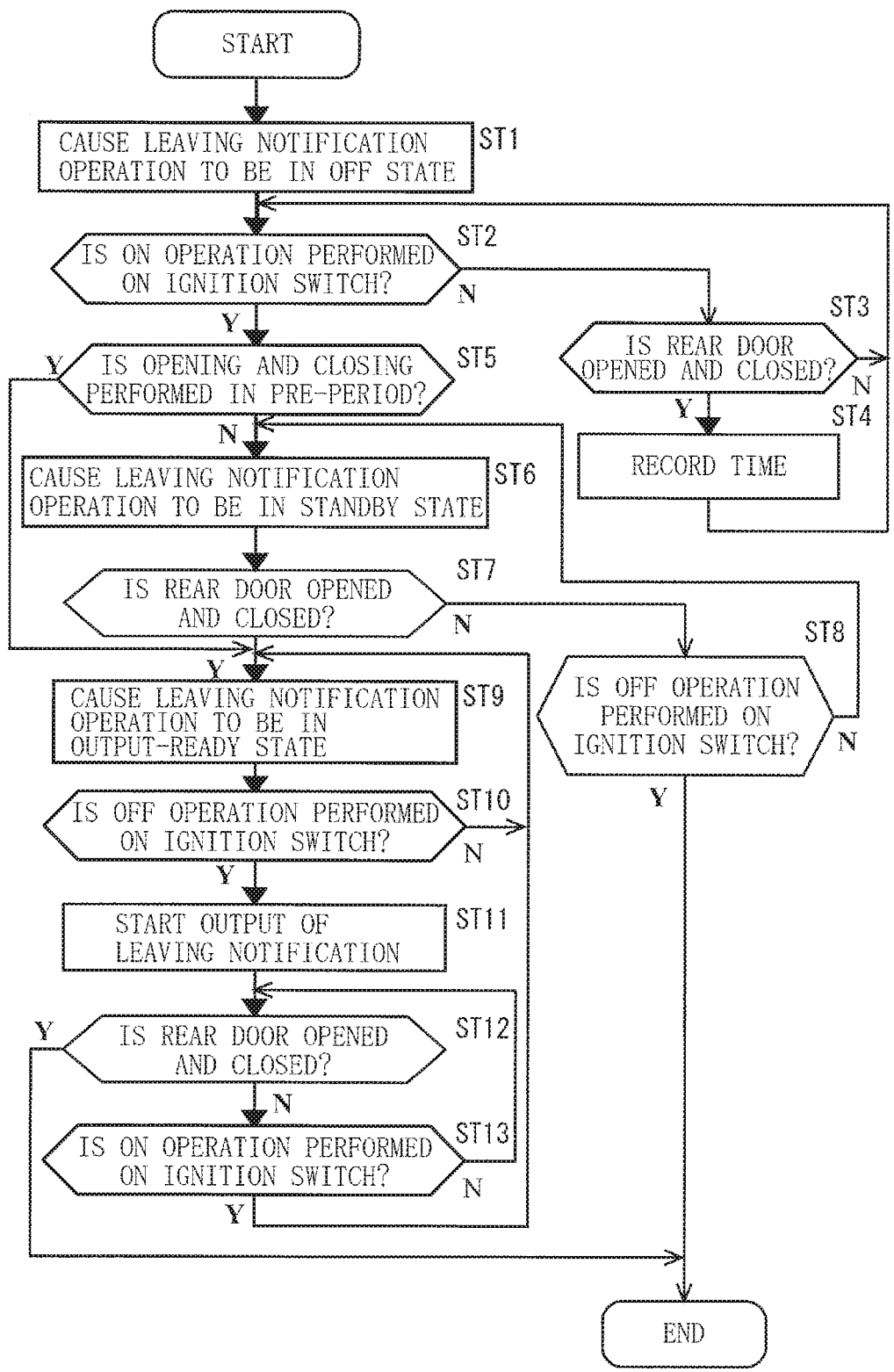
FIG. 4 is a flowchart illustrating an example of a notification process according to a modification example.

FIG. 4 is a flowchart according to a modification example of the notification process illustrated in FIG. 3.

When the ON operation is performed again on the ignition switch in step ST13 illustrated in FIG. 4, the ECU 11 may return the process to step ST12.

In this case, the ECU 11 may uniformly continue to repeatedly output the leaving notification until the rear door opening-closing sensor 14 detects exiting of the passenger, the baggage, or both with respect to the automobile 1, regardless of whether the predetermined post-period has passed or not.

In the forgoing example implementation, in order to suppress the leaving-behind, the ECU 11 may output, from the speaker 17, an electronic sound directed to drawing attention and may display a message on the message displaying device of the meter panel 16 to provide notification of the possibility of the leaving-behind.

Other than this, for example, the ECU 11 may output, from the speaker 17, a message that provides notification of the possibility of the leaving-behind.

Alternatively or additionally, the ECU 11 may cause a device such as a notification lamp of the meter panel 16, a direction indicator, or an interior light, to blink.

Moreover, in one example, the ECU 11 may send a message that provides notification of the possibility of the leaving-behind, to a device carried by the driver via a wireless communication device. Non-limiting examples of the device carried by the driver may include a portable terminal or a keyless entry device.

In the foregoing example implementation, the ECU 11 may determine entering and exiting of the passenger, the baggage, or both with respect to the automobile 1 on the basis of the detection performed by the rear door opening-closing sensor 14 which detects opening and closing of the rear door 5.

Other than this, for example, the ECU 11 may determine entering and exiting of the passenger, the baggage, or both with respect to the automobile 1 on the basis of detection performed by a device such as a seating sensor, a non-contact sensor, or a camera of an occupant monitoring device. The seating sensor may be provided to the rear seat 7 and may detect pressure. The non-contact sensor may detect an object loaded on the rear seat 7.

In the foregoing example implementation, the ECU 11 may determine entering and exiting of the driver with respect to the automobile 1 on the basis of detection performed by the ignition sensor 15 which detects the ON-OFF operation performed on the ignition switch. The ignition switch may be operated to start the traveling of the automobile 1.

Other than this, for example, the ECU 11 may determine entering and exiting of the driver with respect to the automobile 1 on the basis of detection performed by a device such as the front door opening-closing sensor 13, a seating sensor, a non-contact sensor, or a camera of an occupant monitoring device. The front door opening-closing sensor 13 may detect opening and closing of the front door 4. The seating sensor may be provided to the front seat 6 and may detect pressure. The non-contact sensor may detect an object loaded on the front seat 6.

In addition, for example, the ECU 11 may determine entering and exiting of the driver with respect to the automobile 1 on the basis of detection performed by a sensor that detects operation performed on the operation member such as the accelerator pedal, the brake pedal, or a shift lever which are to be operated to allow for the traveling of the automobile 1.

The ECU 11 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the ECU 11 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the ECU 11 illustrated in FIG. 1.

The invention claimed is:

1. A vehicle notification apparatus comprising:
an output unit configured to output a leaving notification that provides a warning of leaving a passenger, baggage, or both behind in the vehicle;
a riding detector configured to detect any of passenger vehicle entering, passenger vehicle exiting, baggage vehicle entering, and baggage vehicle exiting, the passenger vehicle entering being entering of the passenger with respect to the vehicle, the passenger vehicle exiting being exiting of the passenger with respect to the vehicle, the baggage vehicle entering being entering of the baggage with respect to the vehicle, the baggage vehicle exiting being exiting of the baggage with respect to the vehicle;

a driver detector configured to detect any of vehicle traveling stop operation, vehicle traveling start operation, driver vehicle entering operation, and driver vehicle exiting operation, the vehicle traveling stop operation being operation, performed by a driver of the vehicle, directed to stopping of traveling of the vehicle, the vehicle traveling start operation being operation, performed by the driver, directed to starting of the traveling of the vehicle, the driver vehicle entering operation being operation, performed by the driver, directed to entering of the driver with respect to the vehicle, the driver vehicle exiting operation being operation, performed by the driver, directed to exiting of the driver with respect to the vehicle; and a controller configured to cause the output unit to output the leaving notification on a condition that the riding detector has already detected the passenger vehicle entering, the baggage vehicle entering, or both when the driver detector detects the vehicle traveling stop operation, the driver vehicle exiting operation, or both, the controller being also configured to cause the output unit to output the leaving notification each time the driver detector detects the vehicle traveling stop operation, the driver vehicle exiting operation, or both, until the riding detector detects the passenger vehicle exiting, the baggage vehicle exiting, or both, wherein the riding detector comprises an opening-closing sensor configured to detect opening and closing of an open-close member of the vehicle, wherein the open-close member is to be opened and closed upon the passenger vehicle entering, the baggage vehicle entering, or both, and wherein the controller is configured to determine that the opening-closing sensor detects the passenger vehicle entering, the baggage vehicle entering, or both on a condition that the opening-closing sensor has detected the opening and the closing of the open-close member within a predetermined period before timing at which the driver detector detects the vehicle traveling start operation, the driver vehicle entering operation, or both.

2. The vehicle notification apparatus according to claim 1, wherein the controller is configured to determine that the opening-closing sensor detects the passenger vehicle entering, the baggage vehicle entering, or both on a condition that the opening-closing sensor detects the opening and the closing of the open-close member after the driver detector detects the vehicle traveling start operation, the driver vehicle entering operation, or both.

3. The vehicle notification apparatus according to claim 1, wherein the controller is configured to determine that the opening-closing sensor detects the passenger vehicle exiting, the baggage vehicle exiting, or both on a condition that the opening-closing sensor detects the opening and the closing of the open-close member after the output unit starts to output the leaving notification.

4. The vehicle notification apparatus according to claim 2, wherein the controller is configured to determine that the opening-closing sensor detects the passenger vehicle exiting, the baggage vehicle exiting, or both on a condition that the opening-closing sensor detects the opening and the closing of the open-close member after the output unit starts to output the leaving notification.

5. The vehicle notification apparatus according to claim 1, wherein the controller is configured to determine that the opening-closing sensor does not detect the passenger vehicle exiting, the baggage vehicle exiting, or both on a condition that the driver detector detects the vehicle traveling start operation, the driver vehicle entering operation, or both while the opening-closing sensor still does not detect the opening and the closing of the open-close member after the output unit outputs the leaving notification, and the controller is configured to cause the output unit to output the leaving notification again on a condition that the driver detector detects the vehicle traveling stop operation, the driver vehicle exiting operation, or both after the controller determines that the opening-closing sensor does not detect the passenger vehicle exiting, the baggage vehicle exiting, or both.

6. The vehicle notification apparatus according to claim 2, wherein the controller is configured to determine that the opening-closing sensor does not detect the passenger vehicle exiting, the baggage vehicle exiting, or both on a condition that the driver detector detects the vehicle traveling start operation, the driver vehicle entering operation, or both while the opening-closing sensor still does not detect the opening and the closing of the open-close member after the output unit outputs the leaving notification, and the controller is configured to cause the output unit to output the leaving notification again on a condition that the driver detector detects the vehicle traveling stop operation, the driver vehicle exiting operation, or both after the controller determines that the opening-closing sensor does not detect the passenger vehicle exiting, the baggage vehicle exiting, or both.

7. The vehicle notification apparatus according to claim 3, wherein the controller is configured to determine that the opening-closing sensor does not detect the passenger vehicle exiting, the baggage vehicle exiting, or both on a condition that the driver detector detects the vehicle traveling start operation, the driver vehicle entering operation, or both while the opening-closing sensor still does not detect the opening and the closing of the open-close member after the output unit outputs the leaving notification, and the controller is configured to cause the output unit to output the leaving notification again on a condition that the driver detector detects the vehicle traveling stop operation, the driver vehicle exiting operation, or both after the controller determines that the opening-closing sensor does not detect the passenger vehicle exiting, the baggage vehicle exiting, or both.

8. The vehicle notification apparatus according to claim 4, wherein the controller is configured to determine that the opening-closing sensor does not detect the passenger vehicle exiting, the baggage vehicle exiting, or both on a condition that the driver detector detects the vehicle traveling start operation, the driver vehicle entering operation, or both while the opening-closing sensor still does not detect the opening and the closing of the open-close member after the output unit outputs the leaving notification, and the controller is configured to cause the output unit to output the leaving notification again on a condition that the driver detector detects the vehicle traveling stop operation, the driver vehicle exiting operation, or both after the controller determines that the opening-closing sensor does not detect the passenger vehicle exiting, the baggage vehicle exiting, or both.

9. The vehicle notification apparatus according to claim 1, wherein the driver detector comprises a sensor configured to detect ON-OFF operation of an ignition switch to be operated to cause the vehicle to travel.

10. The vehicle notification apparatus according to claim 2, wherein the driver detector comprises a sensor configured to detect ON-OFF operation of an ignition switch to be operated to cause the vehicle to travel.

11. The vehicle notification apparatus according to claim 3, wherein the driver detector comprises a sensor configured to detect ON-OFF operation of an ignition switch to be operated to cause the vehicle to travel.

12. The vehicle notification apparatus according to claim 4, wherein the driver detector comprises a sensor configured to detect ON-OFF operation of an ignition switch to be operated to cause the vehicle to travel.

13. The vehicle notification apparatus according to claim 5, wherein the driver detector comprises a sensor configured to detect ON-OFF operation of an ignition switch to be operated to cause the vehicle to travel.

14. The vehicle notification apparatus according to claim 6, wherein the driver detector comprises a sensor configured to detect ON-OFF operation of an ignition switch to be operated to cause the vehicle to travel.

15. The vehicle notification apparatus according to claim 7, wherein the driver detector comprises a sensor configured to detect ON-OFF operation of an ignition switch to be operated to cause the vehicle to travel.

16. The vehicle notification apparatus according to claim 8, wherein the driver detector comprises a sensor configured to detect ON-OFF operation of an ignition switch to be operated to cause the vehicle to travel.

17. A vehicle notification apparatus comprising:

an output unit configured to output a leaving notification that provides a warning of leaving a passenger, baggage, or both behind in a vehicle;

a riding detector configured to detect any of passenger vehicle entering, passenger vehicle exiting, baggage vehicle entering, and baggage vehicle exiting, the passenger vehicle entering being entering of the passenger with respect to the vehicle, the passenger vehicle exiting being exiting of the passenger with respect to the vehicle, the baggage vehicle entering being entering of the baggage with respect to the vehicle, the baggage vehicle exiting being exiting of the baggage with respect to the vehicle;

a driver detector configured to detect any of vehicle traveling stop operation, vehicle traveling start operation, driver vehicle entering operation, and driver vehicle exiting operation, the vehicle traveling stop operation being operation, performed by a driver of the vehicle, directed to stopping of traveling of the vehicle, the vehicle traveling start operation being operation, performed by the driver, directed to starting of the traveling of the vehicle, the driver vehicle entering operation being operation, performed by the driver, directed to entering of the driver with respect to the vehicle, the driver vehicle exiting operation being operation, performed by the driver, directed to exiting of the driver with respect to the vehicle; and circuitry configured to
cause the output unit to output the leaving notification on a condition that the riding detector has already detected the passenger vehicle entering, the baggage vehicle entering, or both when the driver detector detects the vehicle traveling stop operation, the driver vehicle exiting operation, or both, and cause the output unit to output the leaving notification each time the driver detector detects the vehicle traveling stop operation, the driver vehicle exiting operation, or both, until the riding detector detects the passenger vehicle exiting, the baggage vehicle exiting, or both, wherein the riding detector comprises an opening-closing sensor configured to detect opening and closing of an open-close member of the vehicle, wherein the open-close member is to be opened and closed upon the passenger vehicle entering, the baggage vehicle entering, or both, and wherein the circuitry is configured to determine that the opening-closing sensor detects the passenger vehicle entering, the baggage vehicle entering, or both on a condition that the opening-closing sensor has detected the opening and the closing of the open-close member within a predetermined period before timing at which the driver detector detects the vehicle traveling start operation, the driver vehicle entering operation, or both.

* * * * *